Oct. 8, 1940.   W. D. FOSTER   2,216,909
MAGAZINE AND FILM HANDLING APPARATUS
Filed Oct. 8, 1934   2 Sheets-Sheet 1
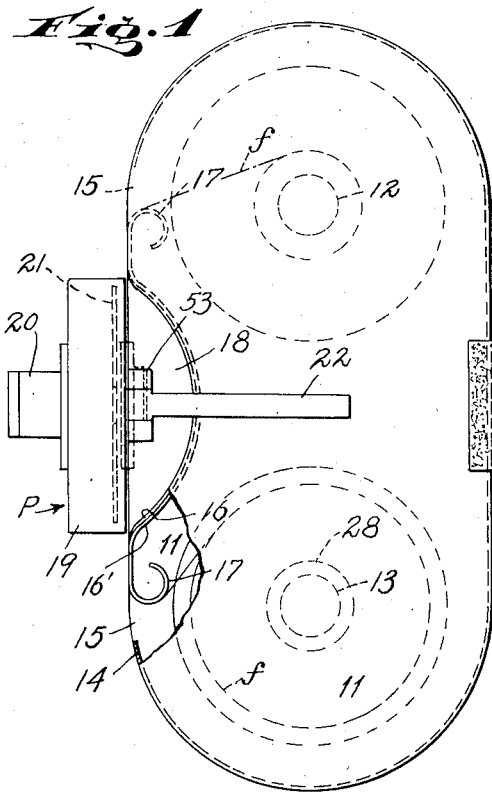
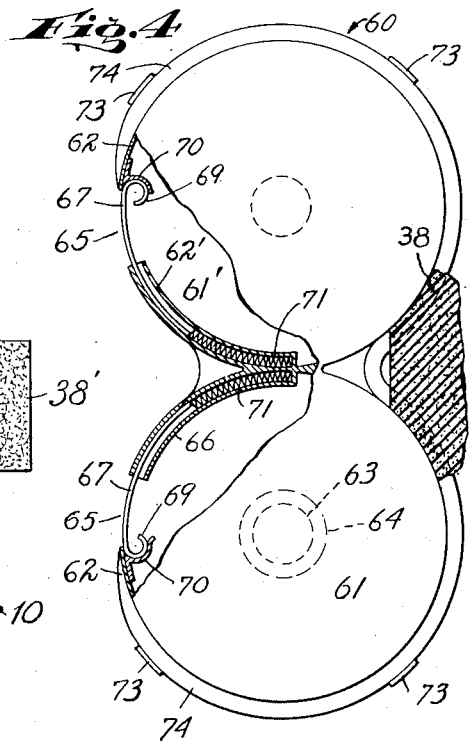
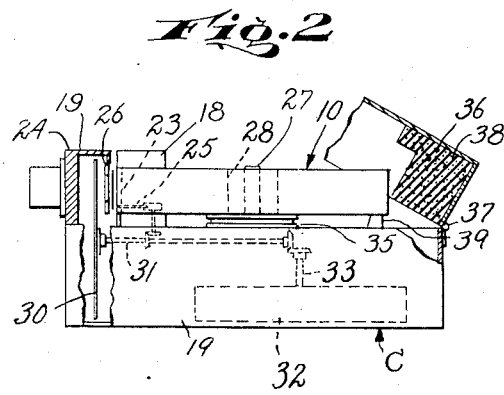
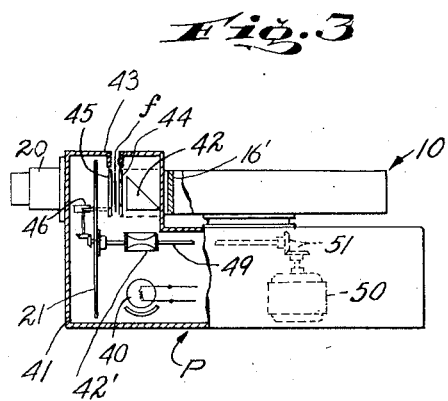
INVENTOR Oct. 8, 1940.  W. D. FOSTER  2,216,909
MAGAZINE AND FILM HANDLING APPARATUS
Filed Oct. 9, 1934   2 Sheets-Sheet 2
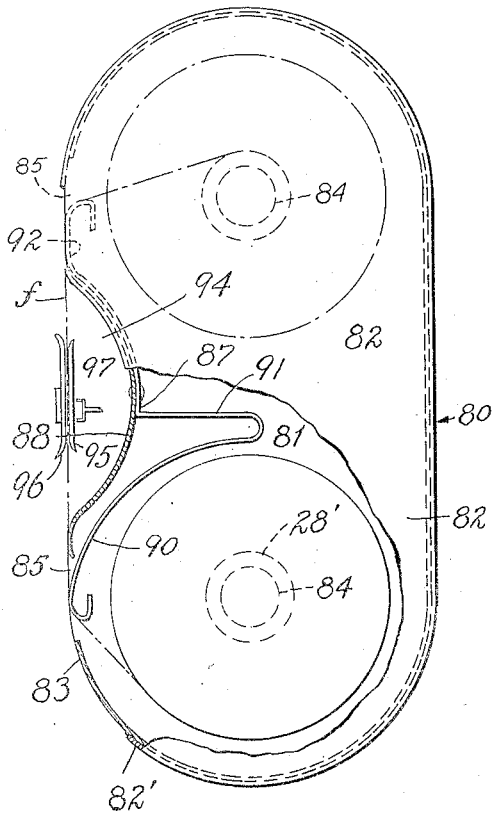
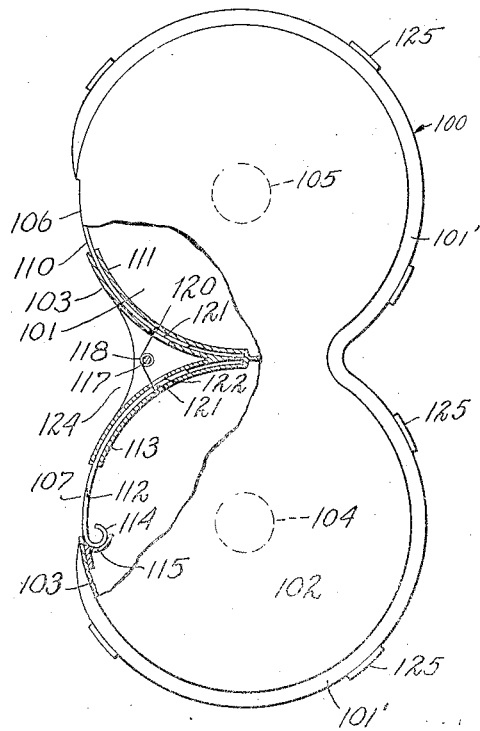
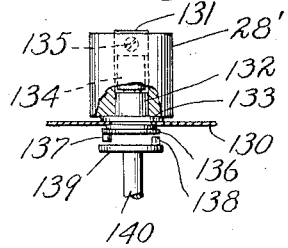
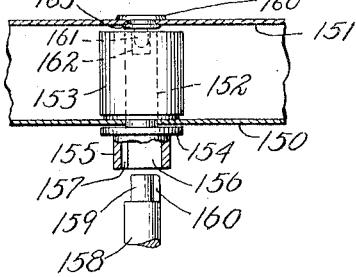
INVENTOR
Warren Dunham Foster Patented Oct. 8, 1940

2,216,909

UNITED STATES PATENT OFFICE 2,216,909

MAGAZINE AND FILM HANDLING APPARATUS

Warren Dunham Foster, Washington Township, Bergen County, N. J., assignor to Kinatome Patents Corporation, Ridgewood, N. J., a corporation of New York Application October 8, 1934, Serial No. 747,472

12 Claims. (Cl. 88—17)

The present invention relates generally to film handling apparatus and more particularly to film magazines for use in such apparatus.

In the patent granted to Clarkson Ulysses Bundick and Barton Allen Proctor, Serial Number 44,482, filed July 18, 1925, now Patent Number 1,944,022, dated January 16, 1934, there is described and broadly claimed improved film tension control methods and apparatus for feeding strip material, and particularly methods and apparatus especially adapted for the feeding of film of the character ordinarily utilized in taking or projecting so-called motion pictures. In my copending application Serial Number 550,778, now Patent 1,975,782, there is described and claimed a magazine which houses the film and which carries mounted thereon auxiliary feeding means employing the Bundick and Proctor film tension control for cooperation with intermittent film feeding mechanism of a motion picture apparatus.

In the copending application of George William Ford, Serial Number 549,067, filed July 6, 1931, as a continuation in part of his parent application, Serial Number 72,855, filed December 2, 1925, now Patent Number 1,944,023, there is described and claimed a magazine or film holder especially adapted for insertion in a motion picture camera or projector in daylight and without requiring the use of a dark room. In my above co-pending application, I stated that my invention described and claimed therein might well be applied to a magazine and film handling apparatus of the types described therein. This application is a continuation in part of my above noted co-pending application. A chief object of this application is to apply the auxiliary feeding or tensioning means shown in my application Serial Number 550,778 to the film holder or magazine shown in said application of George William Ford, Serial Number 549,067, in combination with the apparatus shown therein or otherwise.

Another object of this invention is to provide improved means for holding the magazine on a motion picture apparatus in operative relation to the intermittent feeding means of such apparatus.

A feature of the present invention resides in the provision of the inexpensive resilient means described and claimed herein mounted on the motion picture apparatus for engagement with each and every film holder which may be used with the motion picture apparatus. By this arrangement a simpler construction of the film holder may be utilized since such holders will require no special means for cooperation with the motion picture apparatus for fastening the holders thereon but instead one device carried by the motion picture apparatus is effective for engaging any holder of appropriate size which may be mounted on the apparatus.

In my co-pending application Serial Number 550,778, there is described and claimed a type of film magazine with which is provided an auxiliary resilient film feeding means which also serves as a light trap for the film in the holder or magazine. Another object of the present invention is to provide an improved spring means for rendering operative said combined auxiliary feeding means and light trap.

Said application of George William Ford, Serial Number 549,067, describes a recess in the side wall of the holder between the delivery coil and the take-up coil arranged for receiving film feeding mechanism so that the film drawn from the delivery coil may pass through an opening in the holder and thence in a substantially straight line along the side wall of the holder to another opening adjacent the take-up coil thereby exposing only a minimum amount of film between the two openings. A further object of the present invention is to provide an improved arrangement of the auxiliary feeding means disclosed in my co-pending application Serial Number 550,778 in cooperative relation with intermittent feeding means disposed within the recess of the magazine disclosed in the aforesaid application of George William Ford.

Other objects, characteristics, and advantages of my invention will be evident from the following portion of this specification, the drawings, and the subjoined claims. For purposes of illustration only, I am showing a few exemplifications of my invention, but it will be understood that many others may be employed without departing from the spirit of the invention or the scope of the broader claims. Magazines constructed in accordance with this invention may be for the purpose of holding unexposed or light sensitive films or exposed films carrying fixed and visible images—that is to say, either negative films or positive films. The images carried by such films or to be implanted thereupon may be pictorial or of things or they may be images representing sound. It is to be understood that my invention is equally applicable to a camera or to a projector or to a film playing phonograph, and in some of its aspects to a printer.

Figure 1 is a side elevational view broken away in part, showing a film holder arranged with one form of auxiliary feeding means according to my invention.

Figure 2 is an end view of the structure of Figure 1 broken away in part. In Figure 2 a cover is shown in part for enclosing the film holder after it is in place on the apparatus.

Figure 3 is a view somewhat corresponding to Figure 2 illustrating the film holder of Figure 1 mounted on a motion picture projector shown broken away in part.

Figure 4 is a side view broken away in part which illustrates one form of a film holder arranged with combined auxiliary feeding means and light trap means.

Figure 5 is a view corresponding to Figure 1, broken away in part, and showing a preferred modification of the auxiliary feeding means of Figure 1.

Figure 6 is a view corresponding to Figure 4 and showing a preferred modification of the means for operating the combined auxiliary feeding and light trapping members.

Figure 7 is an elevational detail view, partly broken away, which illustrates one way in which a take-up core may be mounted and driven in a film magazine embodying my invention.

Figure 8 is a view similar to Figure 7 and illustrates another way a take-up core may be mounted and driven in a film magazine embodying my invention.

In Figure 1, the present invention is disclosed as applied to a magazine or film holder of the solid type such as is disclosed and claimed in said copending application of George William Ford, Serial Number 549,067. Such a film holder is illustrated as a flat box or case 10 in which are mounted the delivery and receiving coils of the film. Two substantially parallel top and bottom plates 11 with spindle receiving openings or connections 12 and 13 are joined to each other in spaced parallelism by a supporting side wall member 14. For reasons presently to appear, the opening 12 for the spindle associated with the delivery coil may be omitted in certain cases. The film f passes from and to the interior of the holder through openings 15 in the side wall 14. The portion of the side wall between such openings 15 may be formed of a strip 16 of resilient metal terminating in two film engaging portions each disposed adjacent one of the openings 15 and including a curved film engaging portion 17 which extends interiorly of the magazine. Alternatively, the film engaging extremities 17 and their supporting portions may be of resilient material connected to a non-resilient member, as taught in my parent application. The film f, shown in chain lines, extends over such film engaging rolls from one to the other. As described and claimed in the copending application of the said Ford, Serial Number 549,067, the film case or box 10 is preferably formed with the recess 16' disposed between the openings 15. This recess makes it possible for such a film case to be placed in the film handling apparatus such as a camera or projector without displacement of the film from a straight line along the side of the case. This arrangement permits a portion of the film feeding mechanism of the film handling apparatus to be disposed within the recess when the case 10 is operatively positioned on the film handling apparatus without removing the length of the film between the openings 15 from a substantially straight path therebetween and without drawing out additional film from the magazine. A housing 18 may be supported upon a case 19 of a film handling apparatus, the rearward portion (or rightward portion as viewed in the drawings) of which housing interfits with the periphery of the recess and may contain some of the film handling and contacting portions of the apparatus.

As illustrated in Figures 1 and 3, a length of film between the openings 15 may be positioned in operative relation to the film handling apparatus such as a motion picture projector which may include an objective lens 20 and a usual shutter 21 mounted in the case 19. For facilitating the insertion of the film in operative position with the appropriate parts of the apparatus, a finger 22 may be pivoted on a bracket carried by the motion picture apparatus and be operable after the film has been positioned to bear against the side of the case 10 and help hold it in operative position in the apparatus.

As is evident from Figure 2, which illustrates my invention as applied to a camera C, a gate section 23 is placed adjacent one edge of an extension 24 of the case 19, and a feeding member 25 of conventional construction may operate through an opening in the gate section for engaging the film. The gate section 23 and feeding member 25 may be positioned upon and within the housing 18. The other gate section 26 is placed slightly forwardly from the section 24 or to the left as viewed in Figure 2 so that when the two portions are separated as when the case 10 is being placed in position relative to a take-up spindle 27 the film itself, without being drawn out from the case, is positioned in the appropriate space between such gate sections. It will be understood by those skilled in the art that the spindle 27 may be a stub spindle and have pin clutch means such as are shown in Patent Number 1,868,252, granted to Ponting and Ford for operatively connecting such stub spindle with the outer end of a core 28 upon which the take-up coil may be wound. It will be understood by reference to the above noted patent to Ponting and Ford that the core 28 is automatically placed in operative relation to the stub spindle 27 upon mounting the case 10 in the camera C, as is more clearly evident from Figure 7.

A usual shutter 30 may be provided and be mounted upon a shaft 31 and operated by well known mechanism such as a spring motor 32 having a shaft 33 and mitre gear connecting means with the shaft 31. Such mechanism may likewise operate the film moving mechanism 25 through well known operating connections which need not be described herein for an understanding of the present invention. Also the motor 32 may drive the stub shaft 27 through suitable operating connections of any preferred kind. Since these parts of the motion picture camera form no part of the new structure of the present invention, it is not deemed necessary to describe these parts in detail.

A support 35 is arranged on the camera for helping to support the film case 10. A cover or door 36 for the camera may be provided and hinged to the lower portion of the camera at 37 in the rear of the position assumed by the case 10 when it is in assembled relation to the apparatus. In order to hold the case 10 securely in position in the camera C after the door 36 has been closed, it is a feature of my invention to mount a small block of sponge rubber 38 on the inside of the cover as shown in Figure 2, or a piece 38' of sponge rubber may be secured to the case 10 as shown in Figure 1. This block of sponge rubber is of a size and shape so that it bears against both the rear and top sides of the case 10 when the door 36 is fully closed. By this construction, an inexpensive, positive, yielding means is provided for maintaining the case 10 in proper position in two planes inside the cover 36. In some cases, a boss member 39 may be desirable on the camera C for cooperation with the rubber piece 38 for holding the case 10 in position in the camera. It can be readily seen that the use of the sponge rubber block 38 is especially desirable if only one spindle—the take-up spindle—is employed in connection with the coils of film in the film case 10. This is so whether the spindle 27 is a stub spindle or a spindle of such length that it extends through the core 28.

With further reference to Figure 3, wherein my invention is illustrated as applied to the projector P: a source of light 40 with a conventional reflector is arranged in a closed chamber 41 of the projector P in cooperative relation to a prism 42 mounted in an upper portion 43 of the housing 41 and condensing lens 42'. A gate section 44 is mounted adjacent the prism 42 and between it and the film f which may extend in a straight line between the openings 15 of the film case 10. It will be noted that the gate section 44 and the prism 42 are positioned within the recess 16' of the case 10 and may be within a housing such as that previously described. Another gate section 45 is mounted for cooperation with the gate section 44, and a film feeding member 46 of well known construction may engage the film through a usual slot in the gate section 45. The shutter 21 may be mounted on a shaft 49 to be revolved between the objective lens 20 and a usual aperture in the gate section 45. Means for driving the shutter 21 and the feeding member 46 may include an electric motor 50 and connecting means such as mitre gears 51. If desired, a door member (not shown) similar to the member 36 may be applied to the projector P.

In order to facilitate the insertion of the film between the gate sections 44 and 45, particularly should these sections be positioned forwardly from the recess, a guiding means may be employed which may include a fixed guide member 53 and the finger 22 hinged to the member 53, which finger can be swung upwardly to form a guiding surface cooperating with that of the gate section 44. This finger 22 can be inserted in the recess 16' behind the film so that the act of placing the film carrying case 10 in position automatically directs the film between the gate sections 44 and 45. When this position has been reached the finger 22 is pushed down and serves to help retain the film carrying case 10 in its operative position in the projector. Any suitable spring control may be provided on the finger 22 to hold it in the two positions to which it is adjustable. It can be readily seen that the film guiding means which are illustrated in Figure 1 as applied to a projector may be also applied to a camera, if desired.

If it is desired automatically to open the gate prior to the insertion of the magazine therein and prior to its removal therefrom, apparatus such as shown and claimed in my Patent Number 1,944,030, dated January 16, 1934, co-pending with the parent application hereof, may be employed.

Figure 4 illustrates a film holder or case generally designated as 60 which embodies certain features of my invention. This case includes a top wall 61 and a bottom wall 61' which extends outwardly from the plane of the top wall. The walls each may have a contour as shown in Figure 4 and be joined by a side wall 62. An opening 63 is provided in the bottom wall for connecting a take-up core 64 with a take-up spindle (not shown) for winding the film on the core.

Auxiliary film feeding and tensioning means are provided for use with the case 60 which are arranged also to serve as a light trap in accordance with the disclosure in my above mentioned copending application, Serial Number 550,778. To secure this double function, a guide plate 62' is disposed inwardly of the side wall 62 adjacent an opening therein at 65 provided for passing film outwardly from the delivery coil. Another guide plate 66 is disposed interiorly of that portion of the case 60 adjacent the take-up coil and also adjacent an opening 65 in the side wall 62 opposite the center of the take-up coil. The guide plates 62' and 66 each cooperates with the adjacent portion of the side wall 62 to form an arcuate groove or track for a curved auxiliary feeding member 67 which has the same radius of curvature as the guide plates 62' and 66 whereby the curved auxiliary feeding members 67 may slide freely between the guide plate 62' and the adjacent portion of the side wall 62 and between the guide plate 66 and the adjacent portion of the side wall 62. The ends of the film engaging members 67 each are formed with a curved portion 69 for engaging snugly against concave socket light trap members 70 fastened to the side wall 62 adjacent each opening 65, as shown in Figure 4. Suitable coil springs 71 are arranged in the space between the guide plate elements 61' and 66 and the adjacent portions of side wall normally to urge the film engaging members 67 in a direction to engage against its cooperating socket member 70. The tension of the film will be effective as it is being wound up on the take-up core 64 to move the lower member 67 clockwise sufficiently to hold it in an open position. Also the film being unwound from the delivery coil will move the upper film engaging member 67 downwardly or counter-clockwise to provide an opening through which the film may pass outwardly from the case 60 without bringing the film into contact with the socket 70.

It can be readily seen that when the case 60 is removed from a motion picture camera for example the members 67 will become effective through the action of the springs 71 to move across the openings 65 and completely close them. For mounting the case 60 in a camera or projector resilient fingers 73 may be fastened on the camera for engaging with a projecting rim portion 74 of the lower side wall 62.

It will be noted that the upper and lower portions of the Figure 4 structure are so arranged as to provide a recess between the openings 65 in the side wall 62. Suitable film feeding mechanism may be disposed in this recess as described above in connection with the structures of Figures 1, 2 and 3.

In Figure 5 a film magazine or case generally designated as 80 may have a bottom wall 81, a top wall or cover 82, and a side wall 83 which may be integrally joined to the bottom 81. The cover 82 may be formed with an integral flange member 82'. One or more openings 84 may be provided in the bottom wall for receiving spindles not shown. It will be understood from the explanation hereinbefore that if desired only the take-up coil of film need be connected with a spindle of a film handling apparatus. Openings 85 may be provided in the side wall 83 adjacent the delivery and take-up coils of film for permitting the film f to pass from within the case 80 outwardly and along the side wall 83 and again to pass into the case 80 to be wound up on the take-up coil.

In the structure of Figure 1, which is similar to the structure of Figure 5 in some respects, film tensioning means are provided which may be formed from a single piece of resilient metal which forms a portion of the side wall. In the Figure 5 construction, an auxiliary feeding means is provided in the form of a resilient strip 87 which may be fastened securely as by riveting to a forward side wall portion 88 of the wall 83. It has been found in practice under certain conditions that a film tensioning means for cooperation with the usual intermittent film feeding member of a motion picture apparatus is needed more between the take-up coil and the intermittent feeding member than between the delivery coil and the feeding member. It is not desirable to apply to the delivery coil a sufficient force, because of the resilience of the arm associated therewith, to cause it to revolve sufficiently at first to unwind a supply of film sufficient to cause unsupported slack. In some apparatus built according to the Bundick and Proctor tension control system of feeding, special means are employed to apply a retarding force to the delivery coil throughout the feeding operation. The construction herein described, by applying resilient force of different magnitude to the respective coils, accomplishes the same result more simply and in some cases more advantageously. Therefore, the member 87 is formed for a longer operative movement with relation to the take-up coil than its movement with relation to the delivery coil. Or, if desired, if a short length of film is used, the tensioning means associated with the delivery coil may be omitted. It will be noted that the relatively long resilient arm 90 is so contoured and is so mounted that it does not occupy but little more space in the magazine 80 than the upper resilient arm 92 which is much shorter. The rightwardly extending portion 91 and the adjacent reversely curved portion give this additional resilience to the arm 90. The functioning of the arms 90 and 92 is as is disclosed in my copending application, Serial Number 550,778.

In the structure of Figure 4, a single piece of sponge rubber 38' may be used to engage the magazine in three different planes against displacement from operative position relative to the exposure opening of the gate. It will be noted that the part of the sponge rubber piece 38' which will lie against the top of the container is shown broken away. It will be understood that the piece of rubber 38' is to be fastened to a cover member (not shown).

Alternatively, the sponge rubber 38 and 38' may be applied to the magazine instead of to the apparatus. If so, it preferably will be attached to the back or right hand edge wall and the top edge wall, for cooperation with the coacting portions of the cover.

In Figure 6 there is illustrated a form of film magazine or case 100 which is in some respects similar to the form of film case 60 of Figure 4. This case may have a bottom wall 101 and a top wall 102 joined by a side wall 103. An opening 104 may be provided in the wall 101 for mounting a take-up coil in operative relation with a spindle not shown. If desired an opening 105 may be provided through the bottom wall 101 for mounting a delivery coil on a delivery spindle (not shown). An opening 106 may be provided in the upper part of the case 100 to permit the film being drawn from the delivery coil and an opening 107 may be provided in the lower portion of the case to permit the film to be wound on the take-up coil. Means are provided for closing the openings 106 and 107 against light and also for serving as auxiliary film feeding means for cooperation with an intermittent feeding member such as is shown in Figure 2. Such combined closure means and auxiliary feeding means may include an arcuate member 110 associated with the delivery coil. Means for guiding the member 110 for movement circumferentially of the case 100 include a curved member 111 disposed in spaced parallel relation to the portion of the side wall 103 below the opening 106 and interiorly therefrom. In this construction, a narrow guide-way or track is provided for the curved member 110 along which it may be moved by means presently to be described. For closing the opening in the side wall 103 adjacent the take-up coil a curved member 112 is provided. A guideway for the curved member 112 may be formed by mounting a curved member 113 in spaced parallel relation from the portion of the side wall 103 above the opening 107 and interiorly therefrom. The outer ends of each of the members 110 and 112 may be formed with rounded portions 114 for engagement with socket elements 115 mounted on the side wall 103 adjacent each of the openings 106 and 107. The socket member adjacent the opening 106 is not shown but will be of the same construction and arrangement as illustrated for the socket member 115 adjacent the member 107. For urging the rounded portion 114 against the socket element 115 to secure a light tight closure of the opening 107 and for urging the closure member 110 in a direction to close its associated opening 106, I provide a novel and advantageous arrangement of a simple inexpensive torsional spring 117 which may be mounted on a pin 118 fastened to a projecting portion of the lower wall member 101 at the front of the case. The spring 117 has two arms 120 and 121 as shown in Figure 6. The arm 121 extends downwardly through a slot 122 formed in the side wall portion above the opening 107 and extends further through a small hole in the closure member 112 and terminates just short of the guide member 113. A similar construction and arrangement of parts is provided for assuring the cooperation of the arm 120 and the closure member 110. It can be seen by inspection of Figure 6 that the spring 117 when provided with a suitable initial amount of tension is made effective for urging both the closure members 110 and 112 to their uppermost and lowermost positions respectively, wherein they serve as light traps for the case 100.

The slidably mounted members 110 and 112 each has another function besides functioning as a light trap. As the film is being wound on the take-up coil in the case 100 the tension on the film will raise the slidable member 112 against the tension of the spring 117 a small amount thereby operating as an auxiliary feeding and tensioning means in the way explained more fully in my copending application Serial Number 550,-778 and in the above noted patent to Bundick and Proctor, Number 1,944,022. The slidable member 110 operates in like manner as the film is fed from the delivery coil by an intermittent feeding member such as is shown in Figure 2.

It will be noted that the spring 117 is so mounted that it is to the rear of a recess 124 provided between the upper and lower portions of the case 100. A film feeding member and other mechanism of the apparatus may be mounted in this recess as illustrated in Figures 1, 2 and 3.

For mounting the case 100 in a motion picture apparatus, resilient fingers 125 may be fastened on the motion picture apparatus in any suitable way and arranged for grasping the outwardly extending portions 101' of the lower wall 101. A portion of the lower wall 101 is cut away adjacent the recess 124 opposite the spring 117 and no resilient fingers 125 are positioned to come within the recess since it is desired to leave this part of the apparatus unrestricted for permitting cooperation with a housing such as is shown in Figures 2 or 3 or any other such arrangement as may be desired.

It will of course be understood that if desired power may be applied to the delivery coil to rewind the film, either to place it in condition for re-showing or to project or implant images on the reverse movement, if the apparatus is designed for a plurality of rows of images.

Any desired or conventional means for light proofing the means for transmitting the motion of a driving shaft of an apparatus to the taking-up roll of the film supported within the magazine, or to the taking-up and delivery rolls alternatively, may be employed, such as, for example, those shown in the patent to Casler, Number 636,715, dated November 7, 1899, or the patent to Akeley, Number 1,181,201, dated May 2, 1916. Means for so driving a film roll within a light tight magazine for purposes of further illustration are shown in Figures 7 and 8 hereof.

In Figure 7 there is shown a means for mounting a take-up core 28', similar to the core 28 of the structure shown in Figure 1, in a magazine to be driven from without by mechanism which is operatively connected with the core automatically upon the insertion of the magazine edgewise into a camera, i. e., along a path at right angles to the axis of said core. A side wall of the magazine is designated as 130, and an inwardly extending stub spindle 131 may be revolubly mounted in the wall 130 by means including a bushing 132 having a flange member 133. A sleeve 134 may engage the outer end of the spindle 131 and be held thereon by a screw 135. A flange element 136 may be provided on the shaft 131 and disposed against the outer face of the wall 130.

A pin 137 which is mounted on the flange 136 eccentrically to the axis of the spindle 131 may be driven by a pin 138 fastened in a flange 139 upon a drive shaft 140. The pins 137 and 138 will be brought into engagement with each other upon edgewise movement of the magazine to operative relation with the shaft 140 and upon the revolution of the latter, as is taught by the disclosure of the patent to Ponting and Ford, Number 1,868,252, dated July 19, 1932. The shaft 140 may form part of a motion picture apparatus and be driven by well known means not shown, as, for example, by an operative connection with the shafts 31 or 49 of the machines C and P respectively. It will also be noted that the above described construction provides an arrangement for driving the core 28' through the wall 130 without permitting any light to enter the magazine.

The above construction will be automatically effective following a movement of the magazine in a direction parallel to the axis of the shaft 140 for seating the pins 137 and 138 in such position that 137 may be driven by 138 upon the revolution thereof provided the ends of the pins be tapered so that one will not block the other if they should happen to coincide while the magazine is being seated upon the apparatus.

In Figure 8, there is illustrated another means for mounting a take-up core in a film magazine, such magazine including a side wall member 150 and a cover member 151. A stub spindle 152 may be journalled in a hole through the wall 150 by means of a sleeve 153 being forced on the spindle 152 with a driven fit, the sleeve forming a take-up core for the magazine. A flange member 154 is provided on the outer end of the spindle 153 and a hub extension 155 of the shaft 152 is provided with an axial bore 156 in which there is mounted a clutch key element 157. The spindle 152 may be driven by a shaft 158 of a film handling apparatus having a reduced end portion 159 arranged for reception within the recess 156 when the magazine is mounted on the apparatus. A clutch key element 160 is fastened on the reduced portion 159 and is arranged for driving engagement with the clutch key element 157. The outer ends of both clutch elements 157 and 160 may be tapered or sharpened so that one will not engage and hang upon the other when the magazine is moved in a direction parallel to the axis of the shaft 158 for inserting the magazine. A rivet 160' fastened in the cover member 151 may have a pintle extension 161 for engaging in an axial bore 162 in the spindle 152 for helping to hold the latter in axial alignment. In the assembly of the rivet 160' with the cover member 151, a flange portion 163 may be flattened against the inner edge of the cover by a single blow from a peening tool.

The above described parts, with the exception of the shaft 153 and the rivet, may be die cast, the driven member 157 being a steel insert, if necessary, as when the magazine is designed for frequent use.

It will be readily understood that in a film magazine, particularly for amateur use, simplicity and economy of construction are essential, as well as efficiency of operation. These advantages are secured by the structures shown in Figures 7 and 8.

As will have become readily apparent to one skilled in the art from the foregoing portion of the specification and the attached drawings, my invention may be applied equally well to a projector or to a camera.

It is to be understood that the resilient film engaging members 17, 67, 80, 92, 110 and 112, in their tensioning, film feeding and film guiding functions operate as described and claimed in my copending parent application, Serial Number 550,778. These arms compensate for the difference in character of movement of the intermittent feeding means and the continuously moving masses of film upon the delivery and take-up coils respectively, all in the manner set forth in my parent case. They operate to cushion the pull of the intermittent feeding member upon the delivery roll and of the continuously driven take-up roll upon the portion of the film adjacent the teeth of the pull down, feed film away from the delivery member toward the pull down and from the pull down toward the take-up, and maintain both rolls continuously in motion but at varying rates of speed. They also serve to guide the film in relation to the feeding member and the gate as well as in relation to the magazine itself, and in certain of their exemplifications to form a light proof passageway for the film.

Certain of the advantages of my invention appear from the description hereinbefore. Other advantages arise from the provision of a film magazine having compactly arranged means which permit the magazine to be disposed in a camera in operative relation to the intermittent feeding means. Additional advantages arise from the provision of tensioning members which cooperate differently with the delivery coil and the taking-up coil in accordance with the particular demands of each thereof in the feeding operation. Other advantages arise from the use of an inexpensive, light piece of sponge rubber for holding a film magazine in operative position in a motion picture apparatus.

It will be understood that the above described auxiliary feeding mechanism may be applied to apparatus in which the feeding operation is continuous instead of intermittent, in the manner taught in my copending application, Serial Number 706,768, filed January 15, 1934, as a continuation of my application copending therewith, Serial Number 57,392 filed September 19, 1925, now Patent Number 1,943,303. Consequently in the subjoined claims it is to be understood that the term "intermittent feeding means" or the like is intended to include the continuous feeding means of a projector or camera making use of optical rectification, or a continuous printer, or a sound apparatus. In such uses of my invention, the tensioning arms operate as "ripple-killing" devices and to give the desired smooth and regular flow of the film.

I claim:

1. In a film handling apparatus for feeding a film under tension, the combination with an intermittent film feeding means, of a substantially flat film protective container having a side wall member formed with two openings through which the film passes, the portion of said member lying between said openings being formed of resilient material and shaped for yieldingly engaging the film adjacent each of said openings for cooperation with said intermittent feeding means, said portion of said member between said openings being formed with a reentrant section between said openings, said intermittent feeding means being disposed between the film and the reentrant portion of said side wall member when said film holder is in operative position on said apparatus.

2. In combination, a film handling apparatus having a gate provided with an exposure opening, intermittent feeding means for feeding a film through said gate, and a film magazine having a recessed side wall, said magazine being adapted to support a coil of film having a length extending across the recessed portion of said side wall upon the outer side thereof, said side wall including a resilient portion arranged for yieldingly engaging the film, means for mounting said magazine in said apparatus so that said intermittent means is disposed in the recess in said wall in engagement with the film, said resilient wall portion becoming operative upon the mounting of said intermittent means in said recess to cooperate with said intermittent means for feeding the film through said apparatus, and means for taking up the film as it is fed by said intermittent feeding means.

3. A film magazine including a container having flat top and bottom walls and a side wall connecting said top and bottom walls, said side wall having two curved portions extending in directions to intersect each other with a recess therebetween, said magazine carrying a delivery core and a take-up core, said side wall having an outlet through one of said curved portions for passing the film outwardly from said delivery core, said side wall having an inlet through the other of said curved portions to pass the film inwardly to said take-up core, means for closing said outlet and said inlet to light, said light closing means including a member associated with each of said curved portions and having the same degree of curvature, means operative for guiding said curved members along said curved portions in close proximity thereto and permitting said curved members to be moved across said outlet and said inlet, and a single spring member for urging both of said closing members one across said outlet and the other across said inlet 4. A film magazine including a container having a flat top and bottom wall and a side wall connecting said top and bottom walls, said side wall having two curved portions, each extending inwardly to intersect each other so as to provide a recess therebetween, said magazine carrying a delivery core and a take-up core, said side wall having an outlet through one of said curved portions for passing the film outwardly from said delivery core, said side wall having an inlet through the other of said curved portions to pass the film inwardly to said take-up core, means for closing said outlet and said inlet to light, said light closing means including a member associated with each of said curved portions and having the same degree of curvature, means operative for guiding said curved members along said curved portions and permitting said curved members to be moved across said outlet and said inlet, and means for urging said closing members across said outlet and across said inlet, said last named means including a torsional spring having two arms, one arm being arranged for engagement with one of said curved members for moving it across said outlet, and the other of said arms being arranged for engagement with the other of said curved members for moving it across said inlet, said spring being arranged for normally urging said curved members across said outlet and said inlet.

5. A film magazine including a container having flat top and bottom walls and a side wall having two converging curved portions with a recess therebetween, said magazine having a delivery core and a take-up core, said side wall having an outlet adjacent said delivery core and an inlet adjacent said take-up core, the film passing through said outlet outside of said magazine, across said recess and through said inlet to be wound up on said take-up core, and means for closing said inlet and said outlet to light, said light closing means including a curved member movable along each of said curved wall portions in close engagement therewith, and a single yielding means for urging both of said closing members one across said outlet and the other across said inlet.

6. In combination, a film handling apparatus, intermittent feeding means, a film magazine having means for exposing a length of film for engagement with said feeding means, said exposure means including an outlet and an inlet for said film, a delivery coil and a take-up coil of film being supported within said magazine, means for driving said take-up coil, a leaf spring resilient member disposed in said magazine adjacent said take-up coil, said resilient member being arranged in approximate parallel relation to said take-up coil and extending from a point adjacent said inlet around said take-up coil toward said delivery coil a substantial distance, and means for mounting said resilient member on said magazine, said mounting means including an integral extension of said leaf spring extending toward the side wall of said magazine having said inlet, said leaf spring extension being fastened to said side wall to permit reciprocatory movement of said leaf spring in the plane of said coil.

7. In combination, a film handling apparatus having an intermittent feeding means, a film magazine having means for exposing a length of film for engagement by said feeding means, taking-up means including a revoluble coil in said magazine for winding up the film as it is fed by said intermittent feeding means, a resilient film engaging member adjacent said taking-up coil enclosed in said magazine, said resilient member being disposed in approximate parallel relation to said take-up coil and extending from a point adjacent said inlet around said coil on the side adjacent said delivery coil a substantial distance, and a mounting on said magazine for said resilient member, said mounting including a member fastened on said magazine and extending in unoccupied space in said magazine between said cores to be joined to said resilient member.

8. In combination, a motion picture apparatus having a substantially quadrilateral housing and door therefor, intermittently operating feeding mechanism including a film feeding member movable within said housing and in engagement with a film carried by a magazine, an aperture in said housing cooperating with an aperture in said magazine past which said member is adapted to feed the film contained within a magazine in the focal plane of said apparatus, a film magazine having exterior walls embodying at least two adjacent surfaces each disposed in different planes, one of said walls including an aperture cooperatively disposed in relation to the aperture of said apparatus, cooperatively positioned surfaces within said housing and engaging the exterior walls of said magazine when it is placed within said housing while said door is open thereby guiding said magazine into approximately its operative position relatively to said feeding member and aperture of said apparatus, and a single unitary block of soft sponge rubber mounted upon an interior portion of said door and disposed and arranged for yielding engagement with the surfaces of each of said adjacent walls of said magazine which are disposed in different planes thereby upon the closing of the door moving the magazine in two directions and bringing it into complete operative position within said apparatus in relation to said aperture and feeding member.

9. In combination, a film handling apparatus having a substantially quadrilateral housing and a door thereto, a film magazine having at least two external surfaces each disposed in a different plane, means for mounting said magazine in said apparatus in approximately operative position while said door is open, and an L-shaped block of soft sponge rubber mounted upon an interior portion of said door and arranged for yielding engagement with said magazine when said door is closed, said block being mounted and arranged so that one leg of the L engages one of said surfaces and the other leg of said L engages the other of said surfaces which are disposed in different planes, said L-shaped block of soft sponge rubber being mounted upon said door to be materially compressed between said door and said magazine when said door is closed and to press said magazine firmly against two of the walls of said housing arranged in right-angled and adjacent relation to each other and into complete operative position to said apparatus.

10. In combination, a film handling apparatus having a substantially quadrilateral housing, a door therefor, a film magazine having side walls and top and bottom walls joined to said side walls at right angles, said housing including surfaces engaging said walls of said magazine when said magazine is placed in said housing while said door is open, a unitary block of soft sponge rubber mounted for yielding engagement and substantial compression between an interior portion of said door and said magazine when said door is closed, said block being arranged for engaging one of said side walls and one of said walls adjacent and substantially right-angular thereto.

11. A magazine for use in a motion picture apparatus; said apparatus having a substantially quadrilateral housing, a door thereto, intermittently operating feeding mechanism including a film feeding member movable within said housing, and means including an aperture defining a focal plane in said housing; said film magazine having exterior walls embodying at least two adjacent surfaces each disposed in different planes, one of said walls including an aperture cooperatively disposed in relation to the aperture of said apparatus and including means for rendering the film accessible to said intermittent film feeding member, and a block of soft rubber mounted upon said magazine and extending beyond the plane of two of said magazine walls; said walls of said housing and said apertures and said feeding member and said means for rendering the film accessible thereto being so disposed in relation to each other and to said block of sponge rubber that when said door is closed said door engages said block and forces said magazine into operative position within said housing said apertures are in proper alignment and the film may be fed through the focal plane.

12. In combination, a film handling apparatus having a housing, a door therefor, intermittently operating film moving mechanism including a film feeding member projecting within said housing, a film magazine, means for mounting said magazine in said housing, and sponge rubber of small surface area relatively to the abutting surfaces disposed between said housing and arranged to be compressed by the closing of said door to force said magazine and the film carried thereby into operative position in relation to said film feeding member, said block of sponge rubber also serving to break up the sound and other vibrations caused as by the intermittent operation of said feeding member.

WARREN DUNHAM FOSTER.